Reissued Nov. 2, 1926.

Re. 16,453

UNITED STATES PATENT OFFICE.

OTTO HERMANN, OF CHICAGO, ILLINOIS, ASSIGNOR TO THERMO ELECTRIC BATTERY COMPANY, OF CHICAGO, ILLINOIS, A CORPORATION OF ILLINOIS.

THERMOELECTRIC ELEMENT.

No Drawing. Original No. 1,572,117, dated February 9, 1926, Serial No. 28,034, filed May 4, 1925. Application for reissue filed August 2, 1926. Serial No. 126,750.

My invention relates to improvements in thermo-electric elements for thermo-couples, and it consists in an alloy composed of certain metals in definite proportions.

An object of my invention is to provide a negative element of a thermo-couple which produces a relatively high electromotive force when it is joined in a well known manner to a positive element to form a thermo-couple. In designating this alloy, as a negative element of the thermo-couple, it will be understood that the current flows over the hot junction from the positive element to this novel negative element, and back to the positive element through the external circuit.

A further object of my invention is to provide a negative element of a thermo-couple, having a low temperature coefficient, (that is, a small increase of ohmic resistance per degree rise in temperature) and a relatively small thermal conductivity, while the electrical conductivity of the element is relatively high.

Other objects and advantages will appear in the following specification, and the novel features of the invention will be particularly pointed out in the appended claims.

In carrying out my invention, I make use of an alloy composed of 81% of nickel, 17% of molybdenum, and 2% of vanadium.

A thermo-couple formed from this alloy as the negative element and constantan, an alloy composed of 40% of nickel and 60% of copper as the positive element, consumes a relatively small quantity of heat for a given quantity of electrical energy produced. This fact has been found to be due to the high electro-motive force obtained with this thermo-couple, together with the low temperature coefficient and the relatively small ohmic resistance and thermal-conductance of both of the thermo-elements.

Besides having a low temperature coefficient and a fairly small ohmic resistance compared with its thermal-conductance, the ductility of the nickel alloy permits it to be forged, drawn into wire or ribbon, and rolled into sheet form. It has considerable tensile strength and resists oxidation at higher temperatures.

I have found that other nickel-molybdenum-vanadium alloys varying in composition only slightly from the composition herein disclosed, have a smaller electrical potential and electrical conductivity, and also an increased temperature coefficient and thermal conductivity, and therefore do not possess the properties which my improved thermo-element does possess.

I claim:

1. A thermo-electric element consisting of an alloy composed of substantially 81% of nickel, 17% of molybdenum and 2% of vanadium.

2. A thermo-electric element including nickel and at least 15% of molybdenum.

3. A thermo-electric element consisting of nickel, at least 15% of molybdenum and not more than 3% of a metallic substance having a fusing point considerably below that of molybdenum.

4. A thermo-couple having a ductile positive element and a ductile negative element, each of said elements being made up of two or more elements so proportioned that said couple is adapted to generate an electro-motive force in excess of an average of .09 millivolts per centigrade degree difference of temperature at temperatures as high as 600° C.

5. A thermo-couple having a positive element composed of a ductile nickel alloy and a negative element composed of a ductile nickel alloy, the percentage of nickel in said elements being of such an amount that said couple is adapted to generate an electro-motive force in excess of an average of .09 millivolts per centigrade degree difference of temperature at temperatures as high as 600° C.

6. A thermo-couple having a positive element composed of a ductile alloy and a negative element composed of a ductile alloy adapted to generate an electro-motive force in excess of an average of .09 millivolts per centigrade degree difference of temperature, said negative element having a specific resistance with reference to centimeter cube between the values of $.8\times10^{-4}$ and $1.6\times10^{-4}$ ohms.

7. A thermo-couple having a positive element composed of a ductile alloy and a negative element composed of a ductile alloy adapted to generate an electro-motive force in excess of an average of .09 millivolts per centigrade degree difference of temperature, said negative element having a thermal conductivity with reference to centimeter cube which lies between .018 calories and .042 calories per centigrade degree difference of temperature.

8. A thermo-couple having a positive element and having a negative element whose thermal conductivity with reference to centimeter cube lies between .018 calories and .042 calories per centigrade degree difference of temperature, and which has a specific resistance with reference to centimeter cube between the values of $.8\times10^{-4}$ and $1.6\times10^{-4}$, and which thermo-couple is adapted to generate an electro-motive force in excess of an average of .09 millivolts per centigrade degree difference of temperature.

9. A thermo-couple capable of operating in a practical manner and during a useful life at temperatures as high as 450° centigrade, said couple having elements whose ratio of electrical to thermal conductance is such that at least one per cent of the heat absorbed at its hot junction is converted into electrical energy available for use in an external circuit.

10. A negative thermo-electric element alloy composed of nickel, molybdenum and vanadium, the quantity of molybdenum and vanadium contained in the alloy being adapted to impart a relatively high electrical conductivity to the alloy compared with its low thermal conductivity.

11. A thermo-couple capable of operating in a practical manner and during a useful life at temperatures as high as 450° C., and having elements capable of being welded together, said elements having a ratio of electrical to thermal conductance such that at least 1% of the heat absorbed at its hot junction is converted into electrical energy available for use in an external circuit.

12. A ductile alloy composed of nickel, a refractory metal and vanadium, the refractory metal being present in an amount of at least 15% by weight.

13. A thermo-couple which produces an average electro-motive force in excess of .09 millivolts per centigrade degree difference of temperature, the metallic elements thereof having a ratio of electrical to thermal conductance greater than .35.

14. A thermo-couple which produces an average electro-motive force in excess of .09 millivolts per centigrade degree difference of temperature, the elements thereof being free from oxidation at temperatures as high as 400° C., and which elements have a ratio of electrical to thermal conductance greater than .35.

In witness whereof, I hereunto subscribe my name this 29th day of July, A. D. 1926.

OTTO HERMANN.